Patented Feb. 16, 1943

2,311,023

UNITED STATES PATENT OFFICE 2,311,023

CHLOROHYDRIN OF UNSATURATED ALCOHOL

Benjamin T. Brooks, Old Greenwich, Conn., assignor to Standard Alcohol Company

No Drawing. Application December 16, 1939, Serial No. 309,578

2 Claims. (Cl. 260—633)

The present invention relates to the conversion of unsaturated alcohols to chlorohydrins by the addition of hypochlorous acid to the carbon-carbon double bond of the unsaturated group. Any alcohol of the formula $RCH=CHCH(R_1).OH$ in which R and $R_1$ may be hydrocarbon radicals or hydrogen and which is soluble or sparingly soluble in water is adapted to be used in the process of this invention. More particularly, the present invention has to do with the conversion of relatively simple unsaturated alcohols which are soluble in water, as for example allyl alcohol and methyl allyl alcohol. Allyl alcohol is thus converted to chlorodihydroxy propane or glycerine mono-chlorohydrins and methyl allyl alcohol to the corresponding chlorohydrins.

It is well known that the treatment of simple olefins such as ethylene and propylene with chlorine-water results in the formation of the chlorohydrin of the olefin in good yields. Chlorine-water contains the reaction products of chlorine and water in equilibrium, $Cl_2+H_2O=HOCl+HCl$, and, in addition to hypochlorous acid, always contains free chlorine. The chlorohydrins of ethylene and propylene, produced by the action of chlorine-water therewith, react only very slowly with free chlorine. However, chlorine reacts readily with alcohols to give the corresponding aldehydes or ketones or their chlorination products. In the case of allyl alcohol, the free chlorine reacts readily with the double bond, $CH=CH$, and also the $CH_2OH$ group to form acrolein and chlorinated derivatives of acrolein. The formation of acrolein from allyl alcohol under these conditions may also be regarded as due to oxidation of the alcohol or $CH_2OH$ group.

It has now been found that if a salt of a weak acid is added to the aqueous solution of allyl alcohol, the chlorinating or oxidizing action of the free chlorine can be eliminated, probably by shifting the above chlorine plus water reaction to the right and substantially eliminating free chlorine and hydrochloric acid from the reaction mixtures. It has further been found that soluble alkali salts of weak acid, which readily combine with hydrochloric acid but which leave the hypochlorous acid largely in the free uncombined condition, are satisfactory for the purpose of this invention. Alkali carbonates, bicarbonates and borates are examples of salts of weak acids applicable to the present process. Of these, it is preferred to use the bicarbonate or carbonate, both on account of their cheapness and because during the reaction they decompose to yield carbon dioxide which appears as an ebulliency at the surface of the reaction mixture. This effervescence caused by the escape of carbon dioxide can be used as an indicator for controlling the reaction. When the effervescence ceases, it shows that the carbonate has been completely decomposed and the introduction of chlorine is then discontinued.

The reaction is best carried out at room temperature or slightly below, namely, 10 to 20° C. The reaction is exothermic and appropriate means should be provided for dissipating the heat of reaction so as to maintain the temperature of the reaction mixture within the desired limits of 10 to 20° C. Unsaturated alcohols, miscible with water, such as allyl alcohol, afford no difficulty in contacting their aqueous solution with hypochlorous acid in the presence of salts of weak acid; chlorine is passed into the aqueous alcohol solution containing at least one mol equivalent of alkali carbonate or borate, as herein more fully described. However, in the case of unsaturated alcohols of four or five carbon atoms or more, which are not really miscible with water, such as crotyl alcohol, mechanical difficulties arise in attempting to contact the aqueous alcohol with hypochlorous acid. These difficulties can be overcome by the vigorous agitation of the reaction mixture which promotes solution of the alcohol as the conversion to the more soluble chlorohydrins proceeds.

The products are liquids, heavier than water, which may, however, be isolated by distilling off the water, separating most of the salt which crystallizes out as the distillation proceeds, and finally distilling under reduced pressure. However, the aqueous reaction mixture containing the chlorohydrins may be employed, if desired, for further chemical reactions or the chlorohydrins may be recovered as described or by other conventional means such as extraction by an immiscible solvent.

Example 100 parts of allyl alcohol and 63 parts of sodium carbonate in 800 parts of water were cooled to 10° C. Chlorine gas was then bubbled slowly into the solution. The temperature was maintained at between 10 and 20° C. by means of an ice bath. When the evolution of carbon dioxide caused by the decomposition of the carbonate had ceased, the introduction of chlorine was stopped. The water was then distilled off and the precipitated salt removed by filtration. The filtrate was distilled under reduced pressure yielding 182 parts of glycerine mono-chlorhydrin. This yield of mono-chlorohydrin shows that less than 5% of allyl alcohol was lost during the reaction by conversion to acrolein or chlorinated derivatives of acrolein.

The preceding disclosure is given by way of illustration and is not to be construed as in any way limiting the invention.

What is claimed is:

1. The method of making a chlorohydrin which consists in dissolving a mono-unsaturated alcohol in water, adding stoichiometrical proportions of sodium carbonate based upon the hydrochloric acid to be generated during the process, cooling the solution to between 10°–20° C., passing chlorine gas into the solution while maintaining the temperature of the reaction mixture at between 10°–20° C. until all of the unsaturated alcohol has reacted as is shown by the cessation of carbon dioxide effervescence and recovering the chlorohydrin.

2. The method of making chloro-dihydroxy propanes which consists in dissolving 100 parts of allyl alcohol in 800 parts of water, adding 63 parts of sodium carbonate and cooling the solution to 10° C., then passing chlorine gas into the solution while maintaining the temperature in the reaction mixture between 0°–20° C. until evolution of carbon dioxide ceases, removing water by distillation, filtering the precipitated salt and recovering the chlorodihydroxy propane by vacuum distillation.

BENJAMIN T. BROOKS.